(12) United States Patent
Yoshimitsu et al.

(10) Patent No.: US 7,374,585 B2
(45) Date of Patent: May 20, 2008

(54) METHOD FOR PRODUCING SOLID ELECTROLYTIC CAPACITOR

(75) Inventors: Satoru Yoshimitsu, Saga (JP); Kazumasa Fujimoto, Saga (JP)

(73) Assignees: Sanyo Electric Co., Ltd., Moriguchi-shi (JP); Saga Sanyo Industries Co., Ltd., Kishima-gun (JP)

( * ) Notice: Subject to any disclaimer, the term of this patent is extended or adjusted under 35 U.S.C. 154(b) by 256 days.

(21) Appl. No.: 10/541,873

(22) PCT Filed: Feb. 2, 2004

(86) PCT No.: PCT/JP2004/001014

§ 371 (c)(1),
(2), (4) Date: Jul. 11, 2005

(87) PCT Pub. No.: WO2004/072999

PCT Pub. Date: Aug. 26, 2004

(65) Prior Publication Data

US 2006/0152884 A1    Jul. 13, 2006

(30) Foreign Application Priority Data

Feb. 13, 2003    (JP) .............................. 2003-034737

(51) Int. Cl.
*H01G 9/00*    (2006.01)
(52) U.S. Cl. .................... 29/25.03; 438/386; 438/393; 438/396; 257/E21.008
(58) Field of Classification Search ................ None
See application file for complete search history.

(56) References Cited

U.S. PATENT DOCUMENTS

2006/0179627 A1* 8/2006 Sakai et al. ................ 29/25.03
2006/0223976 A1* 10/2006 Tozawa et al. ............. 528/373

FOREIGN PATENT DOCUMENTS

JP    2002-324733    11/2002

\* cited by examiner

*Primary Examiner*—Michael Lebentritt
*Assistant Examiner*—Cheung Lee
(74) *Attorney, Agent, or Firm*—Kratz, Quintos & Hanson, LLP

(57) ABSTRACT

A production method for a solid electrolytic capacitor comprises the steps of mixing a metal alkoxybenzenesulfonate and/or a metal alkylsulfonate as an oxidizing agent and an electrically conductive polymer in a solvent, immersing a capacitor element in the resulting mixture solution, and forming an electrically conductive polymer layer in the capacitor element by thermal polymerization.

3 Claims, 1 Drawing Sheet

METHOD FOR PRODUCING SOLID ELECTROLYTIC CAPACITOR

TECHNICAL FIELD

The present invention relates to a production method for a solid electrolytic capacitor which includes an anode foil and a cathode foil rolled together.

BACKGROUND ART

FIG. 2 is a sectional front view of a prior art solid electrolytic capacitor 1, and FIG. 1 is a perspective view of a prior art capacitor element 2 (see, for example, Japanese Examined Patent Publication No. HEI4-19695 (1992)).

The solid electrolytic capacitor 1 includes an aluminum case 3 having a top opening, the capacitor element 2 contained in the case 3, and a rubber packing 30 which seals the opening of the case 3. An upper edge portion of the case 3 is curved to fix the packing 30, and a plastic seat plate 31 is attached to the top of the case 3. Lead wires 21, 21 extend from the capacitor element 2 through the packing 30 and the seat plate 31, and then bent laterally.

As shown in FIG. 1, the capacitor element 2 includes an anode foil 4 of an aluminum foil coated with a dielectric oxide film and a cathode foil 5 of an aluminum foil, which are rolled together into a roll with a separator 6 of an insulative material such as paper interposed therebetween. The capacitor element 2 includes an electrically conductive polymer layer provided therein. Lead tabs 25, 25 respectively extend from the anode foil 4 and the cathode foil 5, and the lead wires 21, 21 respectively extend from the lead tabs 25, 25.

A process for forming the electrically conductive polymer layer in the capacitor element 2 will be described below. First, a polymer material of thiophene is dissolved in an alcohol solvent such as ethyl alcohol, and an oxidizing agent such as a metal salt is added to the resulting solution. Then, the capacitor element 2 is immersed in the solution, followed by thermal polymerization at a temperature ranging from a room temperature to about 300° C. Thus, the electrically conductive polymer layer is formed in the capacitor element 2.

Cations in the oxidizing agent are incorporated as a dopant in the polymeric structure of the polymer layer to generate positive holes in the polymer layer, so that the polymer is imparted with the electrical conductivity. Although the solid electrolytic capacitor employing polythiophene as the electrically conductive polymer is well known (see, for example, Japanese Unexamined Patent Publication No. HEI2-15611 (1990)), pyrrole or aniline may be used as the polymer material. It is also known that polyethylenedioxythiophene is employed as an electrolyte and iron(III) p-toluenesulfonate is employed as the oxidizing agent (see, for example, Japanese Unexamined Patent Publication No. HEI9-293639 (1997)). The polymerization speed for polyethylenedioxythiophene is moderate, so that an electrolyte layer can be uniformly formed from the electrically conductive polymer in the capacitor element 2.

There is a market demand for reduction of ESR (equivalent series resistance) of the capacitor of this type. The capacitor which employs polyethylenedioxythiophene as the electrolyte is conventionally used, but does not have ESR characteristics satisfying the market demand. Further, the capacitor 1 of this type has great variations in capacitance and life test results. This is supposedly because the electrolyte layer is not sufficiently densely and uniformly dispersed in the capacitor element 2.

DISCLOSURE OF THE INVENTION

It is therefore an object of the present invention to provide a capacitor which has a lower ESR.

A production method for a solid electrolytic capacitor comprises the steps of mixing a metal alkoxybenzenesulfonate and/or a metal alkylsulfonate as an oxidizing agent and an electrically conductive polymer in a solvent, immersing a capacitor element 2 in the resulting mixture solution, and forming an electrically conductive polymer layer in the capacitor element 2 by thermal polymerization.

BEST MODE FOR CARRYING OUT THE INVENTION

One embodiment of the present invention will hereinafter be described in detail with reference to the attached drawings.

Figure 1:
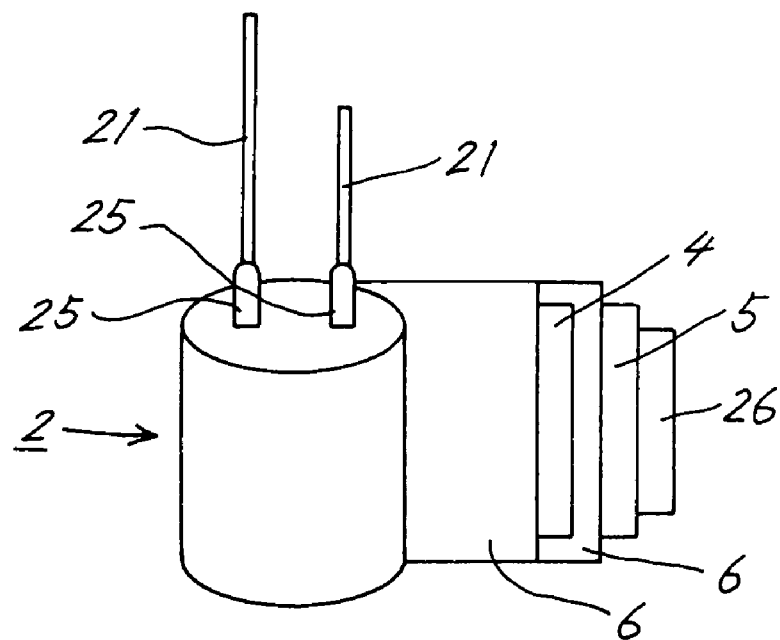
FIG. 1 is a perspective view of a prior art capacitor element.
Figure 2:
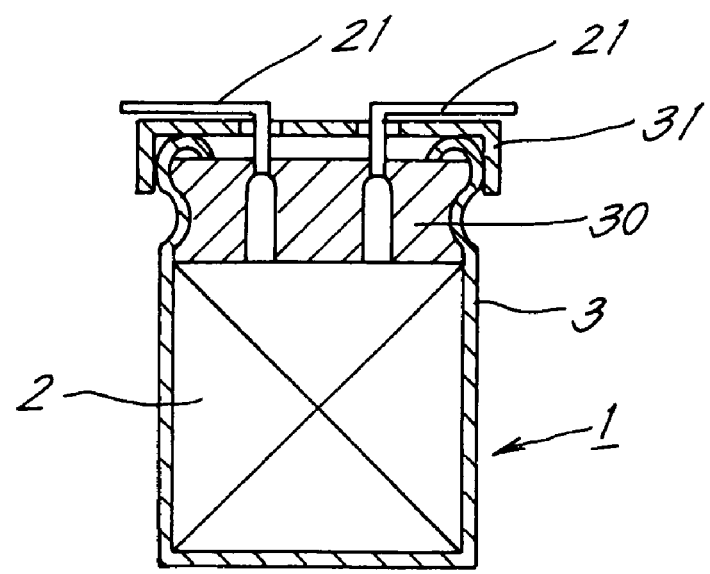
FIG. 2 is a sectional front view of a prior art solid electrolytic capacitor.

A solid electrolytic capacitor 1 has substantially the same overall construction as the prior art capacitor shown in FIG. 2. As shown in FIG. 1, a capacitor element 2 includes an anode foil 4 of an aluminum foil having an electrochemically formed film and a cathode foil 5 of an aluminum foil, which are rolled together into a roll with an insulative separator 6 interposed therebetween and fixed by a tape 26. The capacitor element 2 includes a layer of an electrically conductive polymer provided therein. Examples of the electrically conductive polymer include polythiophene, polypyrrole and polyaniline, but a polythiophene polymer is herein employed as the electrically conductive polymer by way of example. A pair of lead wires 21, 21 extend from the capacitor element 2.

The solid electrolytic capacitor 1 is produced in the following manner. Since the anode foil 4 is prepared by cutting an aluminum sheet, end faces of the anode foil 4 are formed with no dielectric oxide film. Therefore, the capacitor element 2 is subjected to an electrochemical process to form dielectric oxide films on the end faces of the anode foil 4. Thereafter, the capacitor element 2 is thermally treated at 280° C. for stabilization of the characteristic properties of the dielectric oxide films.

Then, the capacitor element 2 is immersed in a mixture solution containing ethyl alcohol as a diluent, 3,4-ethylenedioxythiophene, and a metal salt as an oxidizing agent.

Thereafter, the electrically conductive polymer layer is formed in the capacitor element 2 by thermal polymerization at a temperature ranging from a room temperature to about 300° C., whereby the capacitor element 2 is completed. In turn, the capacitor element 2 is sealed in a case 3, whereby the solid electrolytic capacitor 1 is completed.

This embodiment is characterized in that a metal alkoxy ($C_nH_{2n+1}O-$)benzenesulfonate and/or a metal alkyl ($C_nH_{2n+1}-$)sulfonate is employed as the oxidizing agent. An exemplary alkoxybenzenesulfonate to be employed is methoxybenzenesulfonate, and an exemplary alkylsulfonate to be employed is methanesulfonate.

The inventor produced four types of capacitor elements 2 (20 capacitor elements 2 for each type) as Prior Art Example and Examples 1, 2, 3 by employing different oxidizing agents. The oxidizing agents employed in Prior Art Example and Examples 1, 2, 3 are shown in Table 1.

TABLE 1

|  | Acid moiety of oxidizing agent | Transition metal |
|---|---|---|
| Prior Art Example | (p-toluenesulfonic acid) | Iron(III) |
| Example 1 | (methoxybenzenesulfonic acid) |  |
| Example 2 | (p-toluenesulfonic acid & methanesulfonic acid) |  |
| Example 3 | (methoxybenzenesulfonic acid & methanesulfonic acid) |  |

As shown in Table 1, the capacitor elements 2 of Prior Art Example were produced by employing iron(III) p-toluenesulfonate as the oxidizing agent. Further, the capacitor elements 2 of Example 1 were produced by employing iron(III) methoxybenzenesulfonate as the oxidizing agent. The capacitor elements 2 of Example 2 were produced by employing iron(III) p-toluenesulfonate and iron(III) methanesulfonate in combination as the oxidizing agent. The capacitor elements 2 of Example 3 were produced by employing iron(III) methoxybenzenesulfonate and iron(III) methanesulfonate in combination as the oxidizing agent. The capacitor elements 2 thus produced were each sealed in a case 3, whereby solid electrolytic capacitors 1 were produced. In Prior Art Example and Examples 1, 2, 3, ethyl alcohol was employed as the solvent, and 3,4-ethylenedioxythiophene was employed as the electrically conductive polymer.

The capacitors 1 thus produced each had a rated voltage of 4V and a capacitance of 150 µF, and the cases 3 of the capacitors each had an outer diameter of 6.3 mm and a height of 6.0 mm.

The capacitances ("Cap" in units of µF) of the capacitors of Examples 1, 2, 3 and Prior Art Example were measured by applying a rated AC voltage at 120 Hz. The equivalent series resistances ("ESR" in units of mΩ) of the capacitors were measured by applying a rated AC voltage at 100 kHz. The results of the measurement are shown in Table 2. The electrical characteristic values are each calculated as an average of measured values for 20 samples.

TABLE 2

|  | Cap | ESR |
|---|---|---|
| Prior Art Example | 150 | 20 |
| Example 1 | 152 | 15 |
| Example 2 | 150 | 16 |
| Example 3 | 151 | 15 |

As can be understood from Table 2, the capacitors including the capacitor elements 2 produced according to the present invention each had an improved ESR and were free from reduction in capacitance.

The following is supposedly the reason for the improvement. An oxidizing agent solution containing a metal salt of an alkoxybenzenesulfonic acid (e.g., methoxybenzenesulfonic acid) as the oxidizing agent or an oxidizing agent solution containing a mixture of a metal salt of an alkylsulfonic acid (e.g., methanesulfonic acid) and a metal salt of an aromatic sulfonic acid as the oxidizing agent has a higher acidity than an oxidizing agent solution containing a metal salt of an aromatic sulfonic acid (e.g., toluenesulfonic acid) alone as the oxidizing agent. As a result, cations in the oxidizing agent are more easily incorporated as a dopant in the polymeric structure of the polymer, so that the efficiency of the polymerization for the electrically conductive polymer is increased. Therefore, it is supposed that the filling ratio of the electrically conductive polymer in the capacitor element 2 is increased.

Examples of the alkoxybenzenesulfonic acid other than methoxybenzenesulfonic acid include ethoxybenzenesulfonic acid and butoxybenzenesulfonic acid. Examples of the alkylsulfonic acid other than methanesulfonic acid include ethanesulfonic acid, propanesulfonic acid and butanesulfonic acid. In general, a capacitor element 2 produced by employing an acid having a higher molecular weight tends to have an improved heat resistance and heat stability and stable characteristic properties.

Examples of the transition metal for the metal salt other than iron(III) include copper, chromium, cerium, manganese and zinc.

In the embodiment described above, the capacitor element 2 has a roll structure including the anode foil 4 and the cathode foil 5 rolled together. Alternatively, the capacitor element 2 may have a laminate structure including sintered sheets or plates of a valve metal. The valve metal herein means a metal naturally coated with its oxide, and examples thereof include aluminum, tantalum and niobium. The top opening of the case 3 may be closed by an epoxy resin. Further, the capacitor may be configured in a radial lead form.

INDUSTRIAL APPLICABILITY

In the production of the solid electrolytic capacitor according to the present invention, a metal alkoxybenzenesulfonate and/or a metal alkylsulfonate is employed as the oxidizing agent, whereby the ESR can be improved without reduction in the capacitance.

This is because an oxidizing agent solution containing the metal alkoxybenzenesulfonate and/or the metal alkylsulfonate as the oxidizing agent has a higher acidity than an oxidizing agent solution containing a metal aromatic-sulfonate alone as the oxidizing agent. As a result, cations in the oxidizing agent are more easily incorporated as a dopant in the polymeric structure of the polymer, so that the efficiency of the polymerization for the electrically conductive polymer is increased. Therefore, it is supposed that the filling ratio of the electrically conductive polymer in the capacitor element 2 is increased and hence the electrolyte layer is sufficiently densely and uniformly formed in the capacitor element 2.

What is claimed is:

1. A production method for a solid electrolytic capacitor which includes a capacitor element including an anode coated with a dielectric oxide film, and an electrically conductive polymer layer provided therein, the method comprising the steps of:

mixing a metal salt of an alkoxybenzenesulfonic acid as an oxidizing agent, with a material for an electrically conductive polymer in a solvent; and immersing the capacitor element in the resulting mixture solution, and forming the electrically conductive polymer layer in the capacitor element by thermal polymerization.

2. A solid electrolytic capacitor production method as set forth in claim 1, wherein a metal for the metal salt is a transition metal selected from the group consisting of iron (III), copper, chromium, cerium, manganese and zinc.

3. A production method for a solid electrolytic capacitor which includes a capacitor element including an anode coated with a dielectric oxide film, and an electrically conductive polymer layer provided therein, the method comprising the steps of:

mixing an oxidizing agent with a material for an electrically conductive polymer in a solvent, immersing the capacitor element in the resulting mixture solution, and forming the electrically conductive polymer layer in the capacitor element by thermal polymerization.

wherein the oxidizing agent is a mixture of at least a metal alkoxybenzenesulfonate and a metal alkylsulfonate.

* * * * *